(12) United States Patent
Ryu et al.

(10) Patent No.: US 8,467,577 B2
(45) Date of Patent: Jun. 18, 2013

(54) METHOD, TERMINAL, AND COMPUTER-READABLE RECORDING MEDIUM FOR SUPPORTING COLLECTION OF OBJECT INCLUDED IN INPUTTED IMAGE

(75) Inventors: Jung Hee Ryu, Seoul (KR); Ha Na Ryu, Gyeonggi-do (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/298,363

(22) Filed: Nov. 17, 2011

(65) Prior Publication Data
US 2012/0170806 A1 Jul. 5, 2012

(30) Foreign Application Priority Data
Jan. 4, 2011 (KR) ................. 10-2011-0000650

(51) Int. Cl.
*G06K 9/00* (2006.01)
(52) U.S. Cl.
USPC ........................................... 382/103
(58) Field of Classification Search
None
See application file for complete search history.

(56) References Cited

U.S. PATENT DOCUMENTS

2008/0270240 A1* 10/2008 Chu ................................ 705/14
2009/0063283 A1* 3/2009 Kusumoto et al. ............. 705/14

FOREIGN PATENT DOCUMENTS

| JP | 2005-322081 | 11/2005 |
| JP | 2008-033943 | 2/2008 |
| KR | 10-2006-0122791 | 11/2006 |
| KR | 10-2009-0090613 | 8/2009 |

OTHER PUBLICATIONS

Till Quack; BastianLeibe; Luc Van Gool, "World-Scale Mining of Objects and Events from Community Photo Collections", Jul. 7-9, 2008, CIVR'08 Niagara Falls, Ontario, pp. 47-56.*
"Kooaba as Image Recognition Application for iPhone and Its Possibility," http://gemlove.tistory.com/401 (Jan. 26, 2010).
"PCT Search Report", PCT/KR2011/010346 (May 14, 2012), 2 pages.

* cited by examiner

*Primary Examiner* — Andrew W Johns
*Assistant Examiner* — Siamak Harandi
(74) *Attorney, Agent, or Firm* — Blakely, Sokoloff, Taylor & Zafman LLP

(57) ABSTRACT

The present invention relates to a method for supporting a collection of an object included in an image inputted through a terminal. The method includes the steps of: recognizing the identity of an object by using at least one of an object recognition technology, an optical character recognition technology, and a barcode recognition technology; getting a collection page including at least part of the information on an auto comment containing a phrase or sentence correctly combined under the grammar of a language by using the recognition information and the information on the image of the recognized object; allowing the collection page to be stored when a request for registration of the page is received; and providing a specific user with the information about a reward system.

16 Claims, 5 Drawing Sheets

METHOD, TERMINAL, AND COMPUTER-READABLE RECORDING MEDIUM FOR SUPPORTING COLLECTION OF OBJECT INCLUDED IN INPUTTED IMAGE

CROSS-REFERENCE TO RELATED APPLICATION

This application claims priority to and incorporates herein by reference all disclosure in Korean Patent Application No. 10-2011-0000650 filed Jan. 4, 2011.

TECHNICAL FIELD

The present invention relates to a method, a terminal and a computer-readable recording medium for supporting a collection of an object included in an inputted image; and more particularly, to the method, the terminal and the computer-readable recording medium for recognizing the identity of the object included in the inputted image by using at least one of object recognition technologies, optical character recognition (OCR) technologies or barcode recognition technologies; getting a collection page containing the combination of a grammatical sentence or sentences in a language by using at least part of the information on what the identity of the object is, the place where the image was created and the time when the image was created, i.e., the information on an auto comment, and/or the information on the image of the recognized object; and storing the collection page when the request for the registration of the page is received to thereby allow a user to collect the information on the object of interest rapidly and easily without complicatedly editing information about numerous objects around the user.

BACKGROUND OF THE INVENTION

Recently, due to the wide spread use of the Internet, it has been common to provide information converted to a digital form which was once offered in a form of printing such as books. As the information converted into digital data may be shared and delivered in real time by many users thanks to the spread of the Internet and a 3G network or other high-speed communications systems, it is widely used compared to printed materials which relatively lacks information sharing and delivery.

In particular, a technology of providing several information forms in a method for augmented reality (AR) which displays supplementary information, including computer graphics (CG), texts, etc., combined on an inputted image taken in real time by a user's terminal has been recently introduced. According to the AR technology, the technology may provide a better environment for the user because it may offer various icons including required information which may overlap each other visually on the screen through which the real world the user watches is displayed.

When several information sources are provided and shared by using the AR, it is actually difficult to determine the information on all objects included on an image photographed or inputted by a user's terminal and effectively store the information. Even if the user wants to store only the information on the objects with relatively high interest (or high importance) differentially, it is complicated and vexatious to systematically record and store the information. Therefore, it is true that it has a certain degree of limits to lead the more active participation of the users.

SUMMARY OF THE INVENTION

It is an object of the present invention to solve all the problems mentioned above.

It is another object of the present invention to create a collection page by using information on an auto comment in the use of the information of an object appearing in an inputted image, including what the identity of an object is, the place where the image was created and the time when the image was created, etc. and information on an image corresponding to the object, and to allow the collection page to be systematically stored at a request for registration thereof to thereby enable a user to easily store the information on numerous objects around the user.

It is still another object of the present invention to encourage a user's desire for participation into a mission by providing the information on the mission that may be performed with respect to a certain object and the information on a reward provided when the mission is completed.

In accordance with one aspect of the present invention, there is provided a method for supporting a collection of an object included in an image inputted through a terminal comprising the steps of: (a) recognizing the identity of an object included in an inputted image by using at least one of (i) an object recognition technology which is used to compute degrees of similarity by matching the inputted image which includes the object with already stored reference object images and to recognize the identity of the object by referring to an identifier of a specific reference object image exceeding the preset threshold degree of similarity, (ii) an optical character recognition technology for recognizing the identity of the object by perceiving at least one of a character, a number or a symbol, and (iii) a barcode recognition technology for recognizing the identity of the object from a barcode included in the object; (b) getting a collection page including at least part of (i) the information on an auto comment containing a phrase or sentence correctly combined under the grammar of a language by using the recognition information on at least one of the identity of the object, the place where the inputted image was created, and the time where the inputted image was created and (ii) the information on the image of the recognized object; (c) allowing the collection page to be stored when a request for registration of the page is received; and (d) providing a specific user who collects the object exceeding the predetermined threshold times with the information about a reward system that, in case a designated act is performed with respect to the object, a certain reward is provided.

In accordance with another aspect of the present invention, there is provided a terminal for supporting a collection of an object included in an image inputted therethrough including: an object recognition part for recognizing the identity of an object included in an inputted image by using at least one of (i) an object recognition technology which is used to compute degrees of similarity by matching the inputted image which includes the object with already stored reference object images and to recognize the identity of the object by referring to an identifier of the reference object image exceeding the preset threshold degrees of similarity, (ii) an optical character recognition technology to recognize the identity of the object by perceiving at least one of character, number or symbol, and (iii) a barcode recognition technology to recognize the identity of the object from a barcode included in the object; a collection performing part for getting a collection page including at least part of (i) the information on an auto comment containing a phrase or sentence properly assembled under the grammar of a language by using at least one of recognition information of the identity of the object, the place where the inputted image was created, and the time where the inputted image was created and (ii) the information on the image of the recognized object and allowing the collection page to be stored when a request for registration of the page is received; and a quest managing part for providing a specific user who collects the object exceeding the predetermined threshold times with the information about a reward system that, in case a designated act is performed with respect to the object, a certain reward is provided.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
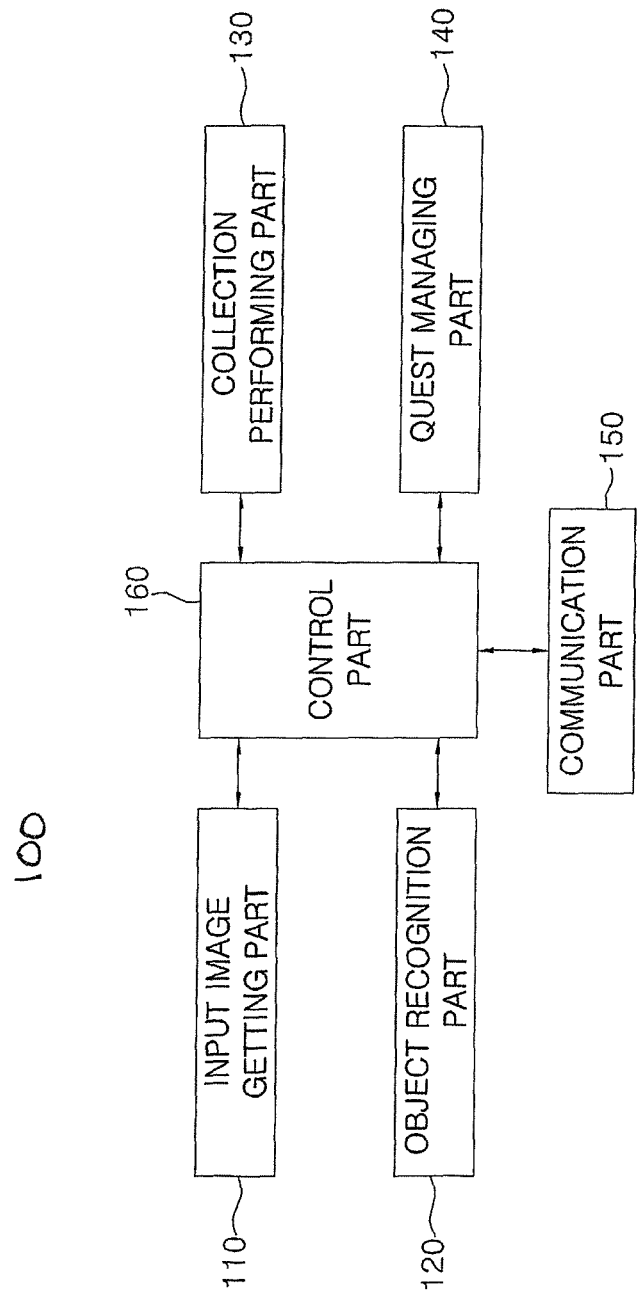
FIG. 1 is a diagram which briefly presents the configuration of a terminal 100 to support a collection of an object included in an inputted image in accordance with an example embodiment of the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced.

These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

A "collection" herein may be defined as a series of processes of collecting and storing an auto comment made by use of at least part of the information on the identity of a specific object which contains its type, property, etc. appearing in an image and the information on the place where the image was created and the time when the image was created and/or an image corresponding to the specific object, etc. For instance, if a movie poster is included in an inputted image, a series of processes of recognizing the poster as the target object of the collection and collecting/storing (i) the information on a combined sentence correct under the grammar of a language from the information on the movie corresponding to the poster (including its synopsis, director, lead actor or actress, etc.), the information on the place where the image of the poster was created and information on the time when the image of the poster was created, and/or (ii) the information on the image of the poster, etc. fall under the "collection" for the movie poster.

Configuration of the Whole System

FIG. 1 is a diagram which briefly presents the configuration of a terminal 100 for supporting a collection of an object included in an inputted image in accordance with an example embodiment of the present invention.

As illustrated in FIG. 1, the terminal 100 in accordance with an example embodiment of the present invention may include an input image getting part 110, an object recognition part 120, a collection performing part 130, a quest managing part 140, a communication part 150 and a control part 160. In accordance with an example embodiment of the present invention, at least some of the input image getting part 110, the object recognition part 120, the collection performing part 130, the quest managing part 140, the communication part 150 and the control part 160 may be program modules communicating with the terminal 100. Such program modules may be included in a form of an operating system, an application program module and other program modules, or they may be stored either in various storage devices well known to those skilled in the art or in a remote storage device capable of communicating with the terminal or the server. The program modules may include but not be subject to a routine, a subroutine, a program, an object, a component, and a data structure for executing a specific operation or a type of specific abstract data that will be described in accordance with the present invention.

First of all, the input image getting part 110 in accordance with an example embodiment of the present invention may perform the function of getting an inputted image. More particularly, the input image getting part 110 in accordance with an example embodiment of the present invention may include a variety of image photographing devices such as a CCD camera and perform the function of receiving a landscape scene around a user who carries the terminal 100 in real time in a preview state.

Furthermore, if the inputted image containing a certain object is acquired by the input image getting part 110, the object recognition part 120 in accordance with an example embodiment of the present invention may perform a function of recognizing the identity of the certain object by using at least one of (i) object recognition technologies which are used to compute degrees of similarity by matching the inputted image with object images already stored in a certain database (hereinafter referred to as "the reference object image") and to recognize the identity of the object through an identifier of a specific reference object image exceeding the preset threshold degree of similarity, (ii) optical character recognition technologies to recognize the identity of the object by perceiving at least one of character, number or symbol included in the photographed object, (iii) barcode recognition technologies used to recognize the identity of the object from the barcode included in the photographed object and the like.

With respect to a certain object recognition technology used to recognize a certain object included in the inputted image from different angles and at a distance, the article titled "A Comparison of Affine Region Detectors" authored jointly by K. MIKOLAJCZYK and seven other authors and published in "International Journal of Computer Vision" in November 2005 may be referred to (The whole content of the article must be considered to have been combined herein). The article describes a method for detecting affine invariant regions to accurately recognize the same object photographed from different angles. Of course, object recognition technologies applicable to the present invention are not limited only to the method mentioned in the article and it will be able to reproduce the present invention by applying various examples. To use the object recognition technology for recognizing the identity of the object by computing degrees of similarity through image matching, the object recognition part 120 may be interlocked with certain database (not illustrated) recording the reference object image and the corresponding identifier.

Moreover, certain OCR technology for recognizing certain character strings included in the inputted image may refer to the specification of Korea Patent Application No. 2006-0078850, of which all must be considered to have been combined herein. The specification mentions a method for creating each candidate character forming a character string included in the inputted image and applying character recognition technology to each created candidate character. The OCR technology which is applicable to the present invention is not limited to the method described in the specification but various examples may be applied.

Figure 2:
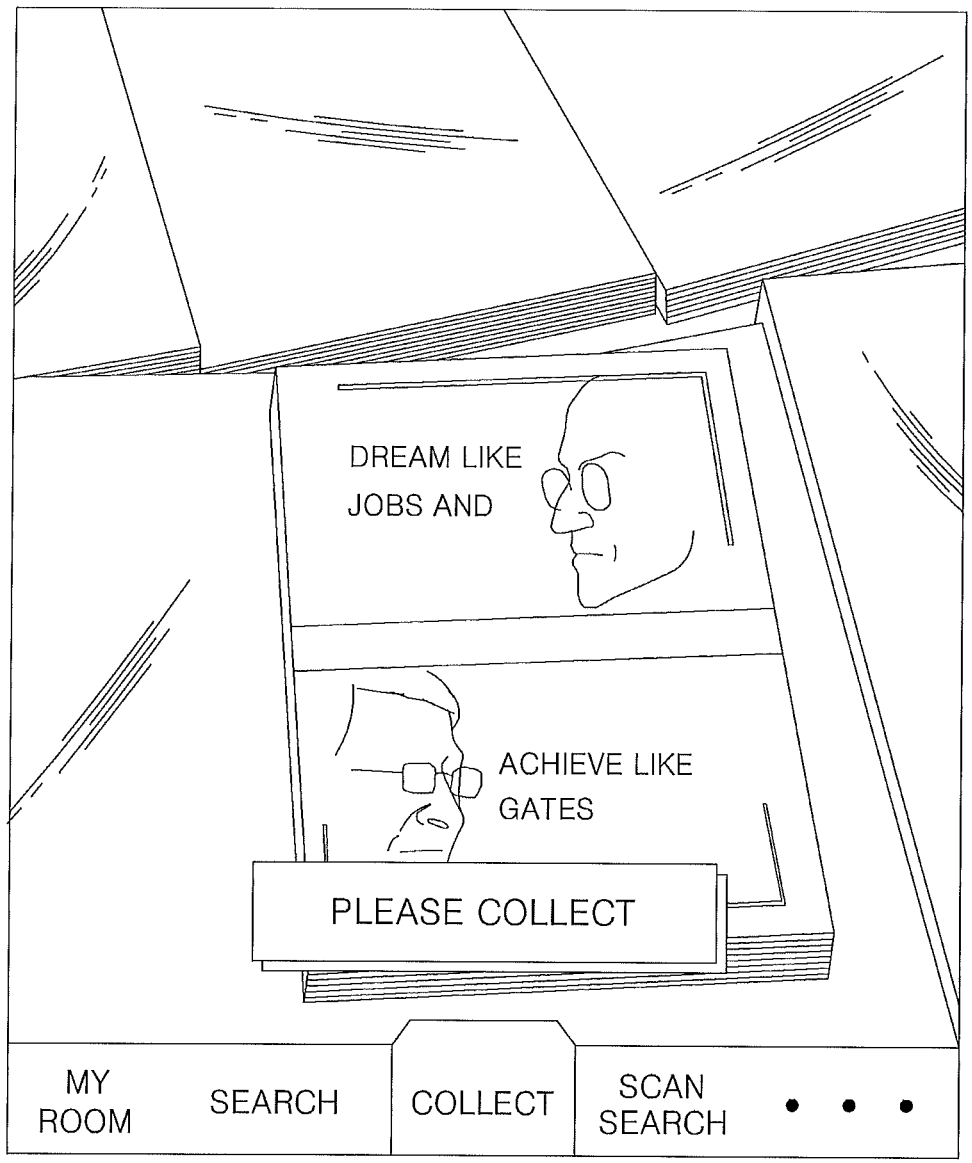
FIG. 2 is an illustration which presents an example of recognizing an object which is included in an inputted image.

In addition, the technology for recognizing a barcode included in the inputted image may refer to the specification of Korea Patent Registration No. 0791704, of which all must be considered to have been combined herein. The specification describes a method for extracting a barcode field by analyzing the adjacency relationship of connection fields on the basis of the characteristics of the structure of a barcode, determining a unit width which is to be used as a module width of the barcode in accordance with the width of the connection field of black pixel in the extracted barcode field and collating the barcode pattern with the input width pattern to recognize the barcode. The OCR technology which is applicable to the present invention is not limited to the method described in the specification but various examples may be assumed. FIG. 2 is an illustration which presents an example of recognizing an object which is included in an inputted image.

By reference to FIG. 2, when a book titled "Dream Like Jobs and Achieve Like Gates" is include in an image inputted into the terminal 100, the object recognition part 120 will be able to recognize the object included in the inputted image as a book "Dream Like Jobs and Achieve Like Gates" by applying the object recognition technology, the OCR technology and/or the barcode recognition technology to the inputted image.

In accordance with an example embodiment of the present invention, the collection performing part 130 may perform a function to get a collection page including (i) the information on a properly assembled phrase or sentence (so-called "an auto comment") under the grammar of a language by using at least part of information on the identity of the object gotten by the object recognition part 120, the place where the inputted image was created and the time where the inputted image was created and/or (ii) the information on the image of the recognized object; and allow the collection page to be stored when a request for registration of the page is received.

More specifically, the collection performing part 130 in accordance with an example embodiment of the present invention will be able to compute the present location of the terminal 100, where the inputted image was created, by using a location positioning technology including GPS technology, A-GPS technology, WPS technology and/or cell-based location based service (LBS) to thereby complete the auto comment to be included in the collection page. For this, the collection performing part 130 may include a specific GPS module, a mobile telecommunication module, etc.

Furthermore, the collection performing part 130 in accordance with an example embodiment of the present invention may get the image of the object to be recognized and included in the collection page directly from the inputted image or indirectly from a specific reference object image which exceeds the preset threshold degree of similarity through the image matching process. The image of the recognized object included in the collection page may be preferably in a thumbnail form.

Meanwhile, the collection performing part 130 in accordance with an example embodiment of the present invention may allow the collection page to be managed by user of the terminal 100. In the case, the collection performing part 130 may assign unique virtual space for supporting each user to manage his or her own collection page.

Figure 3:
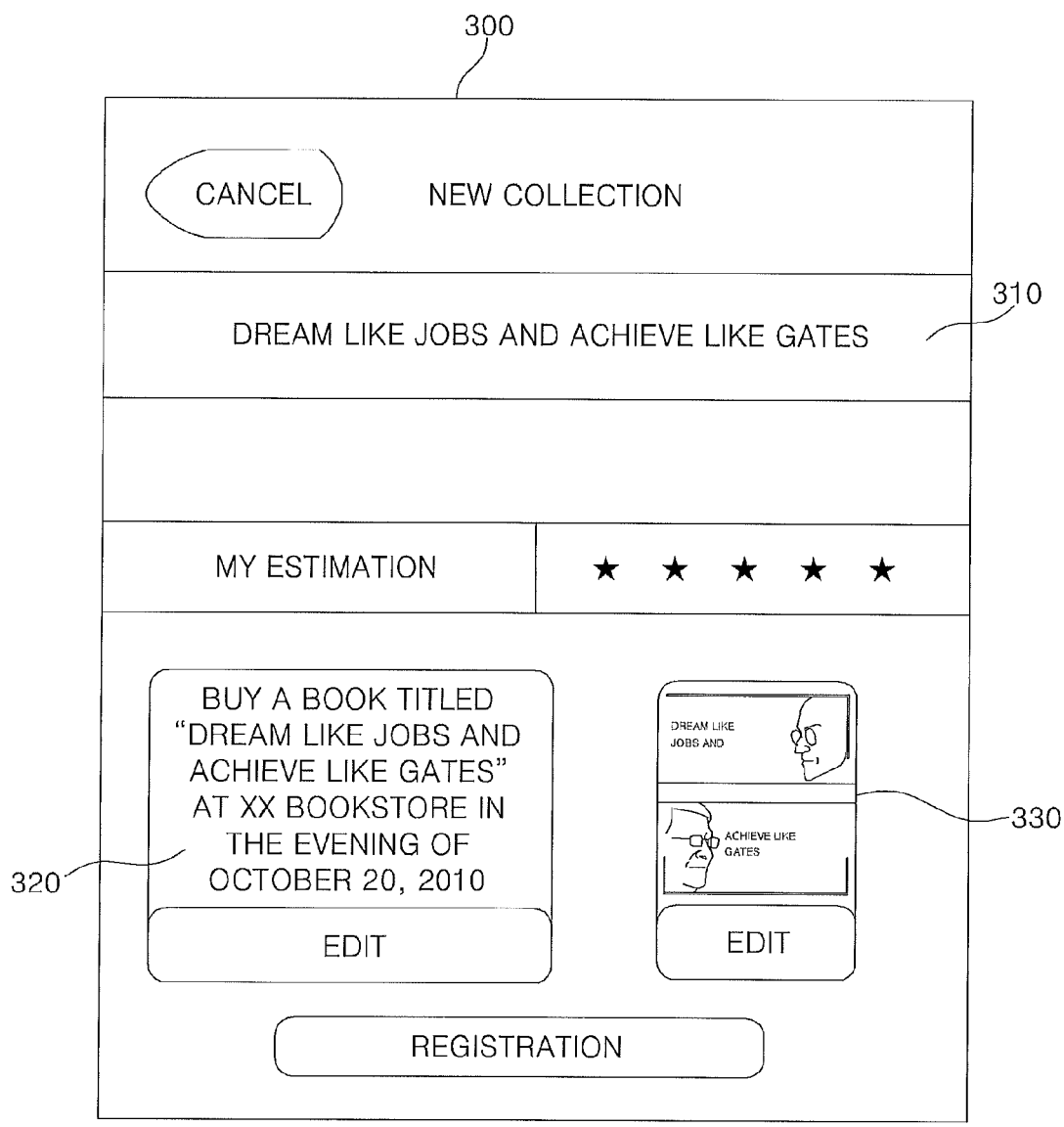
FIG. 3 is a diagram which shows an example of a collection page including the information on an auto comment and the information on the recognized object in accordance with an example embodiment of the present invention.

FIG. 3 is a diagram which shows an example of a collection page containing the information on an auto comment and the information on the image of the recognized object in accordance with an example embodiment of the present invention.

Figure 4:
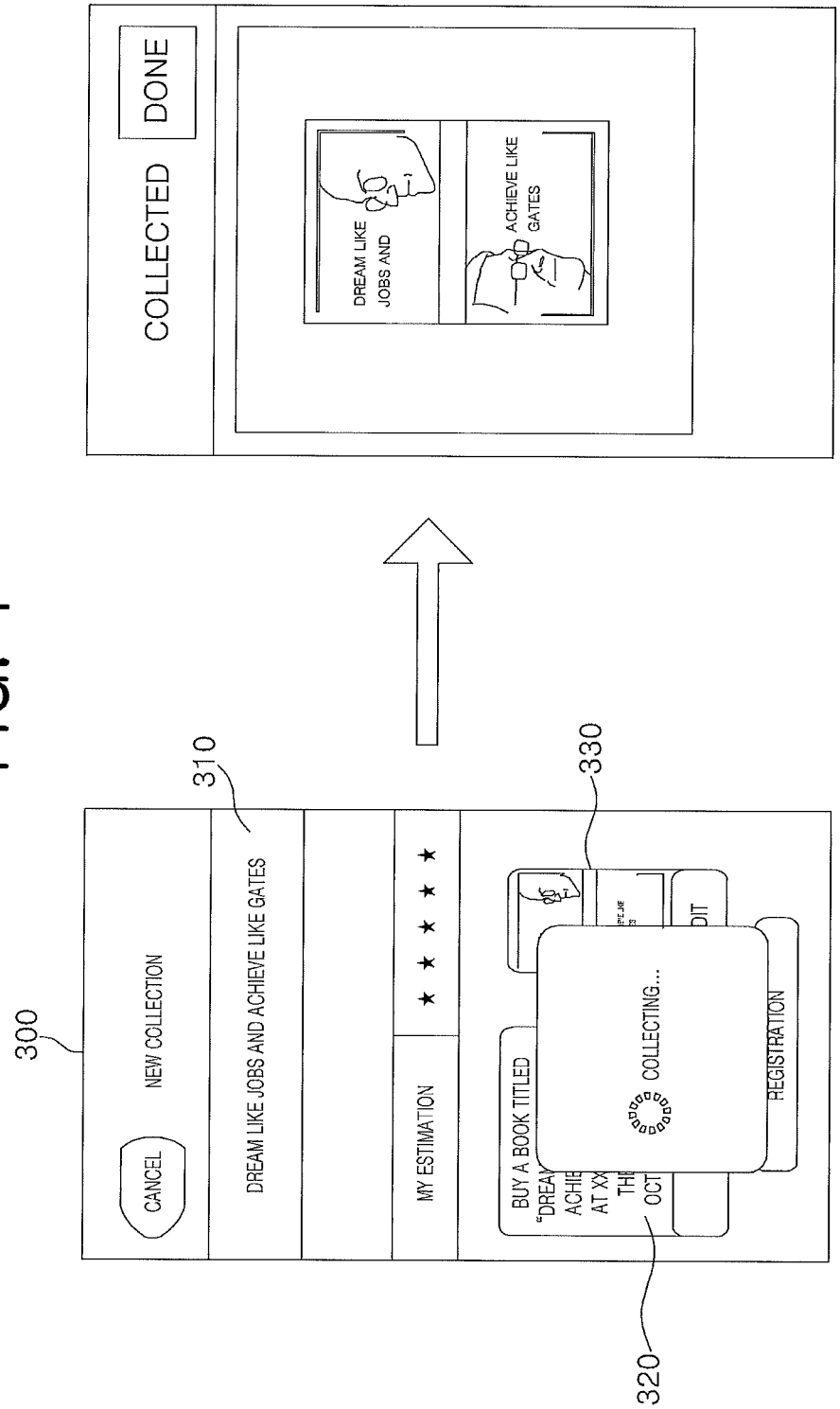
FIG. 4 is a diagram which gives an example of storing the collection page of the object in accordance with an example embodiment of the present invention.

By reference to FIG. 3, it can be found that the collection performing part 130 got the collection page 300 including (i) the auto comment 320 properly assembled under Korean grammar by using the recognition information on the identity of the book 310 obtained by the object recognition part 120 and the recognition information on the place where the inputted image was created ("XX Bookstore") and the time when the inputted image was created ("Oct. 20, 2010") and (ii) the image of the recognized book 330. FIG. 3 exemplarily shows the image of the recognized book 330 being displayed as a thumbnail image indirectly from the reference object image instead of the image directly from the inputted image (i.e., the inputted image in FIG. 2). Even though the collection page 300 in FIG. 3 illustrates that the auto comment 320 and the image of the recognized book 330 are directly displayed but an example embodiment of the present invention is not limited to this and simply storing the information on the auto comment or the information on an identifier of the recognized book may be considered instead of displaying the auto comment 320 and the image of the recognized book 330 directly as described above. Thereafter, the collection performing part 130 may be confirmed to make the user's collection page 300 stored when the request for the registration of the collection page 300 is received (See FIG. 4).

Figure 5:
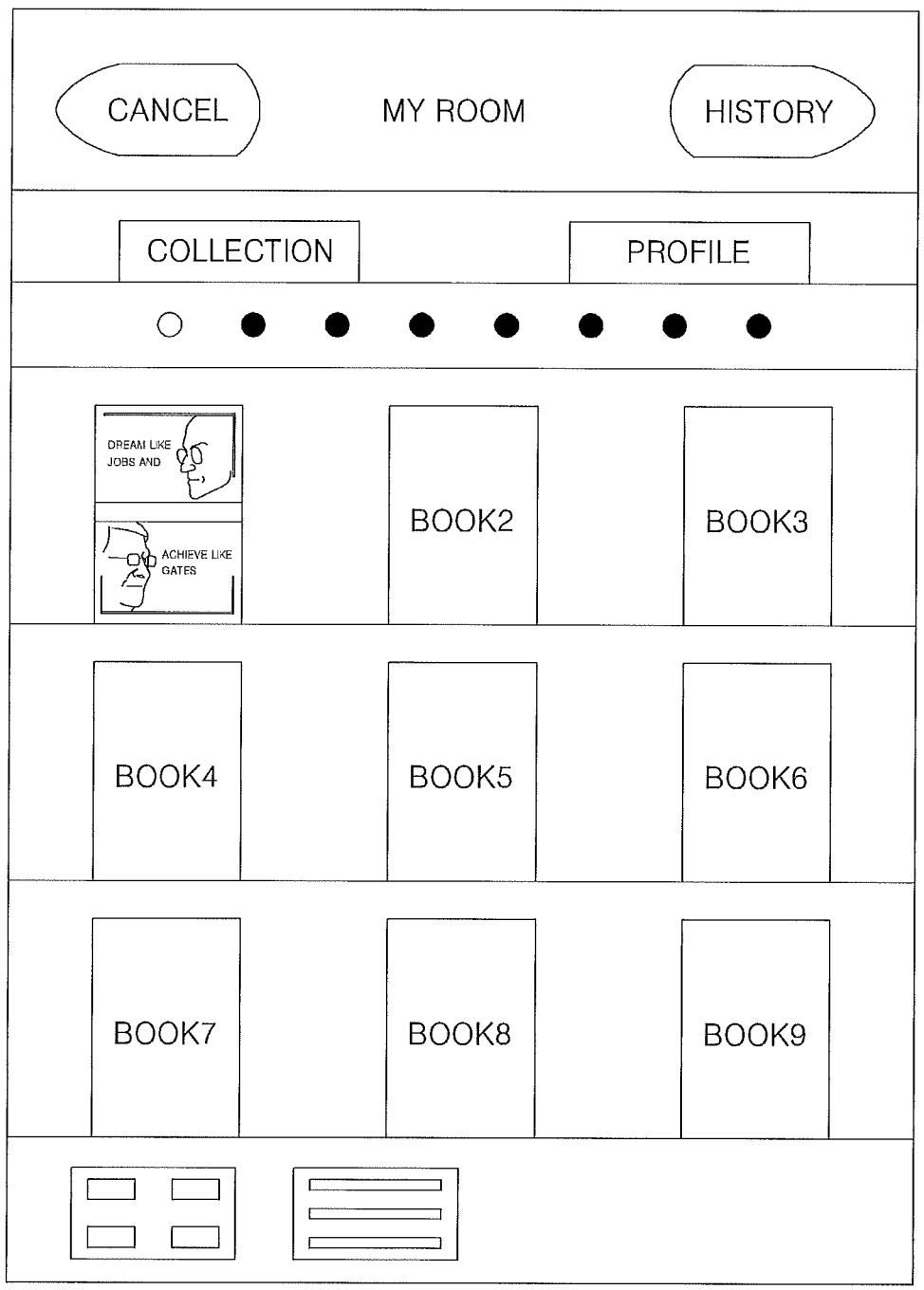
FIG. 5 is an illustration which exemplarily presents unique virtual space assigned to allow each user to manage his or her own collection page in accordance with an example embodiment of the present invention.

FIG. 5 is an illustration which exemplarily presents unique virtual space assigned to allow each user to manage his or her own collection page in accordance with an example embodiment of the present invention.

By referring to FIG. 5, the collection performing part 130 may be found to assign a user's unique virtual space to help the user manage his or her own collection page.

When a specific object is collected for the number of times exceeding the predetermined threshold value, the quest managing part 140 in accordance with an example embodiment of the present invention may perform a function to provide the user with mission information that the user may perform with respect to the object and reward information offered when the mission was performed. More specifically, the mission information may be the information about how many times the user must additionally collect the object and the reward information may correspond to the information provided if the user performs the mission, for example, the information on the coupon issued by a company which services or sells the object. If the user visited and collected a place (an object) "an aquarium in the 63 Building" three times, the quest managing part 140 may be supposed to provide the information (a mission and a reward) of "When the aquarium in the 63 Building is collected two more times, a 50% discount coupon on an admission ticket of the aquarium in the 63 Building will be issued" for the user.

In accordance with an example embodiment of the present invention, the communication part 150 may perform a function to allow the terminal 100 of the present invention to communicate with an external device.

Lastly, in accordance with an example embodiment of the present invention, the control part 160 performs a function to control the flow of the data among the input image getting part 110, the object recognition part 120, the collection performing part 130, the quest managing part 140 and the communication part 150. In other words, the control part 160 controls to perform each unique function in the input image getting part 110, the object recognition part 120, the collection performing part 130, the quest managing part 140 and the communication part 150 by controlling the flow of data from exterior or the flow of data among the components of the terminal 100.

In accordance with the present invention, it is possible to get an auto comment on an object of interest and/or the information on an image and systematically store the auto comment and/or the information on the image at the request for registration to thereby allow a user to store the information on numerous objects around the user quickly and conveniently without complicatedly editing information and manage it.

In accordance with the present invention, it is additionally possible to lead the user to perform a collection for the object more actively because the information on the mission achievable with respect to the object and the information on the reward to be granted when the mission is clear is provided for the user on the basis of the collected information on the object.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a compiler but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for supporting a collection of an object included in an image inputted through a terminal comprising the steps of:
    (a) recognizing the identity of an object included in an inputted image by using an object recognition technology which is used to compute degrees of similarity by matching the inputted image which includes the object with already stored reference object images and to recognize the identity of the object by referring to an identifier of a specific reference object image exceeding the preset threshold degree of similarity, an optical character recognition technology for recognizing the identity of the object by perceiving at least one of a character, a number or a symbol, and a barcode recognition technology for recognizing the identity of the object from a barcode included in the object;
    (b) getting a collection page including an auto comment containing a phrase or sentence that includes the recognition information for the identity of the object, the place where the inputted image was created, and the time where the inputted image was created and the information on the image of the recognized object;
    (c) allowing the collection page to be stored when a request for registration of the page is received; and
    (d) providing a specific user who collects the object exceeding the predetermined threshold times with the information about a reward system that, in case a designated act is performed with respect to the object, a certain reward is provided.

2. The method of claim 1 wherein, at the step (d), performing the designated act with respect to the object includes achieving the number of collections of the object that is additionally requested to the specific user.

3. The method of claim 1 wherein the information on the certain reward includes the information on a coupon issued by a company which services or sells the object.

4. The method of claim 1 wherein, at the step (b), the image of the object is acquired directly from the inputted image or indirectly from the reference object image exceeding the preset threshold degree of similarity.

5. The method of claim 4 wherein the image of the object is acquired in a form of thumbnail.

6. The method of claim 1 wherein the collection page is stored to allow each user of the terminal to manage it.

7. The method of claim 6 wherein, at the step (c), virtual space is assigned to allow each user to manage the collection page.

8. A terminal for supporting a collection of an object included in an image inputted therethrough comprising:
    an object recognition part for recognizing the identity of an object included in an inputted image by using an object recognition technology which is used to compute degrees of similarity by matching the inputted image which includes the object with already stored reference object images and to recognize the identity of the object by referring to an identifier of the reference object image exceeding the preset threshold degrees of similarity, an optical character recognition technology to recognize the identity of the object by perceiving at least one of character, number or symbol, and a barcode recognition technology to recognize the identity of the object from a barcode included in the object;

a collection performing part for getting a collection page including an auto comment containing a phrase or sentence that includes recognition information of the identity of the object, the place where the inputted image was created, and the time where the inputted image was created and the information on the image of the recognized object and allowing the collection page to be stored when a request for registration of the page is received; and a quest managing part for providing a specific user who collects the object exceeding the predetermined threshold times with the information about a reward system that, m case a designated act is performed with respect to the object, a certain reward is provided.

9. The terminal of claim 8 wherein the quest managing part provides the specific user with the information about a mission with respect to the object and the information about the certain reward provided when the specific user completes the mission.

10. The terminal of claim 8 wherein, if the number of collections of the object additionally requested to the specific user is achieved, the quest managing part provides the specific user with the information on the certain reward.

11. The terminal of claim 8 wherein the quest managing part provides the user with the information on the certain reward including the information on a coupon issued by a company servicing or selling the object.

12. The terminal of claim 8 wherein the collection performing part gets the image of the recognized object directly from the inputted image or indirectly from the reference object image which exceeds the preset threshold degree of similarity.

13. The terminal of claim 12 wherein the collection performing part gets the image of the recognized object in a form of thumbnail.

14. The terminal of claim 8 wherein the collection performing part allows the collection page to be stored for management by each user.

15. The method of claim 14 wherein the collection performing part assigns virtual space to allow the collection page to be managed by each user.

16. One or more non-transitory computer-readable recording media having stored thereon a computer program that, when executed by one or more processors, causes the one or more processors to perform acts including:

recognizing the identity of an object included in an inputted image by using an object recognition technology which is used to compute degrees of similarity by matching the inputted image which includes the object with already stored reference object images and to recognize the identity of the object by referring to an identifier of a specific reference object image exceeding the preset threshold degree of similarity, an optical character recognition technology for recognizing the identity of the object by perceiving at least one of a character, a number or a symbol, and a barcode recognition technology for recognizing the identity of the object from a barcode included in the object;

getting a collection page including an auto comment containing a phrase or sentence that includes the recognition information for the identity of the object, the place where the inputted image was created, and the time where the inputted image was created and the information on the image of the recognized object;

allowing the collection page to be stored when a request for registration of the page is received; and providing a specific user who collects the object exceeding the predetermined threshold times with the information about a reward system that, in case a designated act is performed with respect to the object, a certain reward is provided.

* * * * *